United States Patent
Marrujo et al.

[15] 3,652,050
[45] Mar. 28, 1972

[54] VEHICLE SEAT MOUNTING SYSTEM

[72] Inventors: Ralph G. Marrujo, Valencia; Aki Tanaka, Northridge, both of Calif.

[73] Assignee: Fairchild Industries, Inc., Bay Shore, Long Island, N.Y.

[22] Filed: Feb. 5, 1970

[21] Appl. No.: 8,852

[52] U.S. Cl.................................248/429, 248/361, 248/393, 297/344
[51] Int. Cl...........................................................B60n 1/00
[58] Field of Search................248/424, 425, 429, 430, 393, 248/394, 395, 361; 297/344, 232, 346

[56] References Cited

UNITED STATES PATENTS

| | | | |
|---|---|---|---|
| 3,144,270 | 8/1964 | Bilancia | 297/344 X |
| 3,392,954 | 7/1968 | Malitte | 248/361 X |
| 1,928,814 | 10/1933 | Flintermann | 248/429 |

FOREIGN PATENTS OR APPLICATIONS

| | | | |
|---|---|---|---|
| 1,020,167 | 11/1952 | France | 248/394 |

Primary Examiner—J. Franklin Foss
Attorney—Michael W. York

[57] ABSTRACT

A vehicle seat mounting arrangement for mounting seat sets in vehicles equipped with fixed seat locking tracks. The seat legs are located without regard to the locations of the vehicle tracks and are fastened to a floor panel to provide equalized underseat storage room and unobstructed leg space. The floor panel is provided with movable locking mechanisms which can be aligned with the vehicle seat locking track and secure the seat assembly to the track.

9 Claims, 5 Drawing Figures

PATENTED MAR 28 1972

INVENTOR.
Ralph G. Marrujo
Aki Tanaka
BY
Michael W. York
ATTORNEY

PATENTED MAR 28 1972 3,652,050
SHEET 2 OF 2
Fig. 3
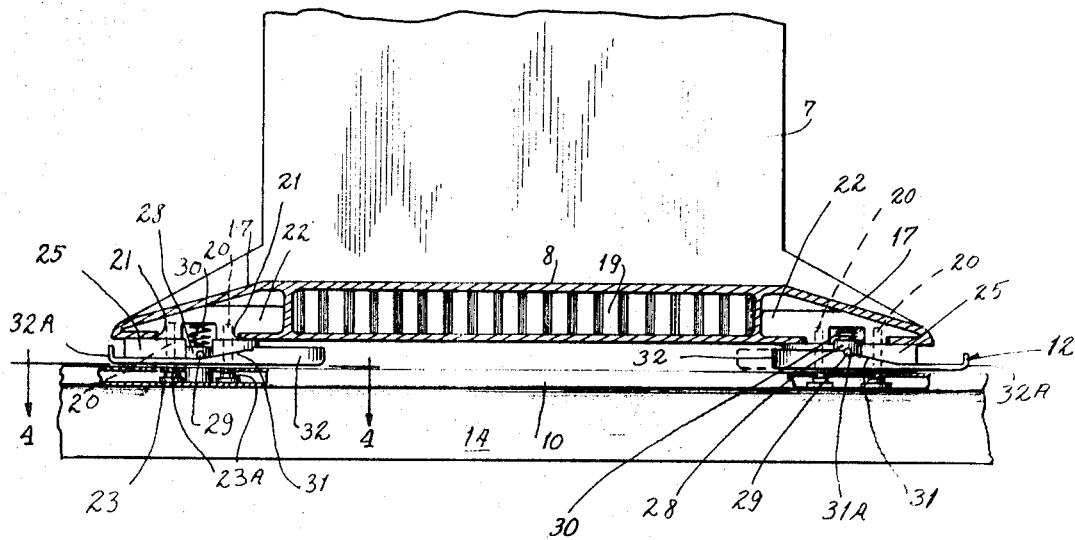
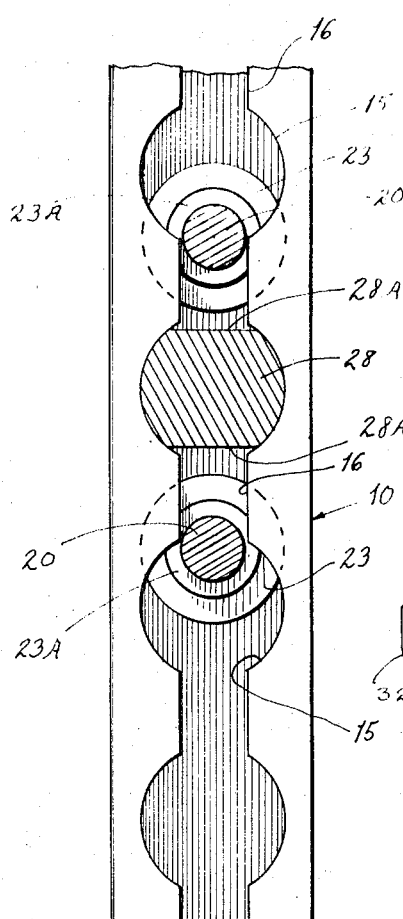
Fig. 4
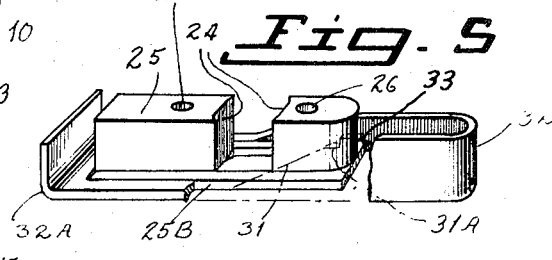
Fig. 5
INVENTOR.
Ralph G. Maakujo
BY Aki Tanaka
ATTORNEY

VEHICLE SEAT MOUNTING SYSTEM

This invention relates to vehicle seats and more particularly to improved means of constructing vehicle seats to facilitate their mounting within vehicles.

Most transport aircraft structures, as well as many other vehicle structures, have provision within the fuselage or passenger compartment for the mounting of seats by means of a plurality of parallel locking tracks situated in the floor structure and extending in a generally fore and aft direction. These locking tracks are adapted to permit simple and rapid installation or removal of seats in the vehicle to accommodate changing requirements brought about by high or low density passenger loads, alterations of the seating class accommodations or to vary the aircraft's passenger cargo carrying capability.

In view of the obvious necessity for having vehicle seats firmly anchored to the vehicle structure, the location of the locking tracks within the vehicle or airframe is understandably dictated for the most part, by structural considerations in the basic design of the vehicle or aircraft, and while these locking tracks are customarily found in the floor structure of the vehicles, the variations between vehicle or aircraft types and models does not permit any degree of standardization of their location or spacing. Consequently, it is often found that such aircraft or vehicle seats are designed for use in a specific type or model of an aircraft or vehicle thus reducing flexibility, increasing cost and necessitating greater inventories of seats for each type and model of aircraft or vehicle in use.

Moreover, the particular location of the locking tracks imposes a severe design restriction which strongly influences vehicle seat design and seat mounting arrangements and in a majority of instances, conventional aircraft or vehicle seat mounting structures are at best a compromise from the standpoint of passenger comfort and convenience, due largely to the fact that the conventional seat mount locations have been prescribed by the locking track locations.

Conventional aircraft and vehicle seats are usually of the plural type, that is, several seats or passenger positions are situated adjacent to one another and oftentimes share a set of mounting legs. In many cases the locations of these legs, in order to be compatible with the locations of the locking tracks, interfere with the leg space of the seat occupants by requiring them to straddle the leg structure of the seat ahead.

In addition, several of the previously mentioned deficiencies are further aggravated by the presence of passenger carry-on parcels which at least on aircraft are required for safety reasons and by regulation to be stored beneath the seats, particularly during certain modes of aircraft operation such as take-offs and landings. When the seat supporting legs are situated, as in most conventional practice, so as to conform to the vehicle locking track locations, the underseat storage space, while possibly adequate for some passengers, is likely to be inadequate or virtually non-existent for others. This is due to the fact that the underseat storage space is usually defined by the location of the seat legs, which if located so as to be compatible with the locking tracks, most often results in inequitably compartmentalized storage space or in the extreme situation, the storage space may be totally lacking for some aisle seat positions. To appreciate this it must be borne in mind that in some conventional vehicle or aircraft seat installations the seat nearest the aisle may be supported from the leg structure in a fully or partially cantilevered fashion so that it in effect protrudes into the aisle area. In such situations it becomes obvious that the occupant of this aisle seat in placing a parcel beneath the seat can in so doing pose a serious hazard to the safety and well being of other passengers as well as himself in that the parcel would not normally be constrained from moving into the aisle space by any seat leg structure. Of course, the hazard is increased immeasurably during acceleration and deceleration of the vehicle or in certain modes of aircraft operations such as landings and take-offs or during other more violent or unexpected maneuvers which could cause such parcels to shift or become dangerous missiles within the passenger compartment.

Accordingly, it is a principal object of this invention to alleviate these shortcomings by providing an improved vehicle seat mounting structure that is capable of permitting the simple and rapid installation and removal of vehicle seats in a variety of different types and models of vehicles without regard to the location or spacing of the vehicle's seat locking tracks.

Another important object of the invention is the provision of a unique mobile locking mechanism which will permit the mounting of vehicle seats to existing locking tracks in vehicles while enabling the leg supports for such seats to be located independently of any locking track considerations in order that the seat legs can be located in a position that optimizes passenger comfort and convenience and facilitates the compartmentization of the underseat storage space so that this area will be accessible to each seat occupant with a minimum of disturbances to others as well as to provide a safe and orderly storage facility for carry-on parcels.

It is another object of this invention to provide a seat mounting structure which will preserve complete flexibility insofar as fore and aft seat spacing, commonly called pitch, is concerned so that the fore and aft seat spacing may be conveniently and rapidly altered or seats can be installed or removed to facilitate changes or variations in class service and/or to provide additional space for cargo rather than passengers, or vice versa.

These and other objects, features and advantages will become more apparent from the following description of the invention and the accompanying drawings in which:

FIG. 3 is a side elevational view partially in section of a portion of the structure illustrated in FIG. 1 showing a seat leg support and mounting structure including side elevations of the unique locking devices of the present invention in the locked and unlocked position and showing a section of the vehicle locking track in its cooperative relationship therewith;

FIG. 4 is a top sectional view taken along the line 4—4 in FIG. 3 showing the relative positions of the locking studs of the invention in the vehicle locking track when the vehicle seats are locked in their normal operative position and FIG. 5 is a perspective view of a portion of the locking device with certain parts removed and broken away for clarity.

Figure 1:
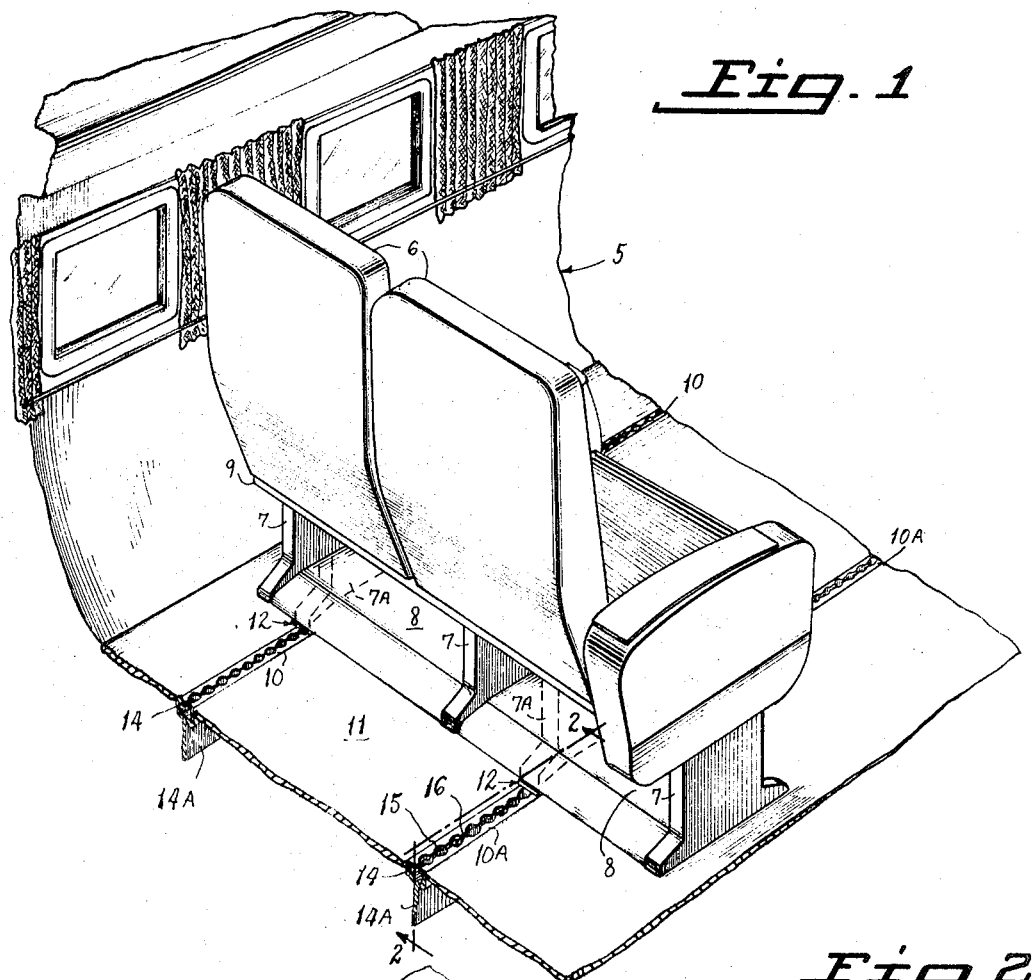
FIG. 1 is a perspective view of two vehicle seats situated side by side and mounted according to this invention within a vehicle showing a pair of vehicle locking tracks in an arbitrary position in the floor structure of the vehicle.

If reference is made to FIG. 1 of the drawings, it will be noted that a portion of a vehicle passenger compartment 5 is depicted with a pair of passenger seats 6 situated side by side within the compartment 5. Both of the seats 6 are connected to a common frame, a portion of which is visible in FIG. 1 and designated by the reference numeral 9.

Seat supporting means comprising leg members 7 are connected to the seats 6 by means of the frame 9 and support the seats above the floor of the passenger compartment of the vehicle. In the particular embodiment shown in FIG. 1, three leg members 7 are connected to the frame 9 that is in turn connected to the seats and are utilized to support a pair of seats, one leg member being situated at each side of the seat frame 9 and one at the center. These leg members also define the underseat parcel storage area available to each of the seat occupants. These leg members 7 are fixedly mounted at their lower ends to a transverse floor panel 8 that is disposed beneath and connected to the lower ends of the legs which also accommodates a plurality of locking devices generally designated by the reference numeral 12 for connecting the panel to floor locking tracks 10 and 10A which are provided in the vehicle floor structure 11. These locking tracks facilitate the fastening of passenger seats 6 in the vehicle or alternatively cargo tie-down fittings (not shown) of a type well known and widely used in the art. These locking tracks 10 and 10A may be located at different locations and have different spacing in different vehicles. The connecting means 12 is adjustable laterally for permitting the connection of the panel 8 to variously spaced locking tracks.

While the actual number, spacing and location of these locking tracks 10 and 10A may vary according to the structural and other characteristics of a particular vehicle or aircraft, the tracks 10 and 10A are of a standard configuration. Essentially they consist of a hollow rectangular or box-like section 14 which may be fastened to or integral with a structural member or beam 14A. The upper surface of these locking tracks 10 and 10A is generally flush with or slightly below the vehicle floor level and has a plurality of apertures 15 spaced equally from one another and intersected by a slot 16 of smaller dimension. The apertures and slots extend along the upper surfaces of the locking tracks along their entire length which is often the entire length of the passenger or cargo compartment of the vehicle.

The aforementioned apertures 15 and slots 16 are adapted to cooperate with locking studs which in conventional seat mounting arrangements are situated at the base of the seat leg members 7. However, as will best be noted in FIG. 1, the position of the leg members 7 is not coincident with the position of the locking tracks 10 and 10A as would be dictated in conventional arrangements where the leg members would, because of the locking track locations, be inconveniently located in the dotted line positions 7A.

Figure 2:
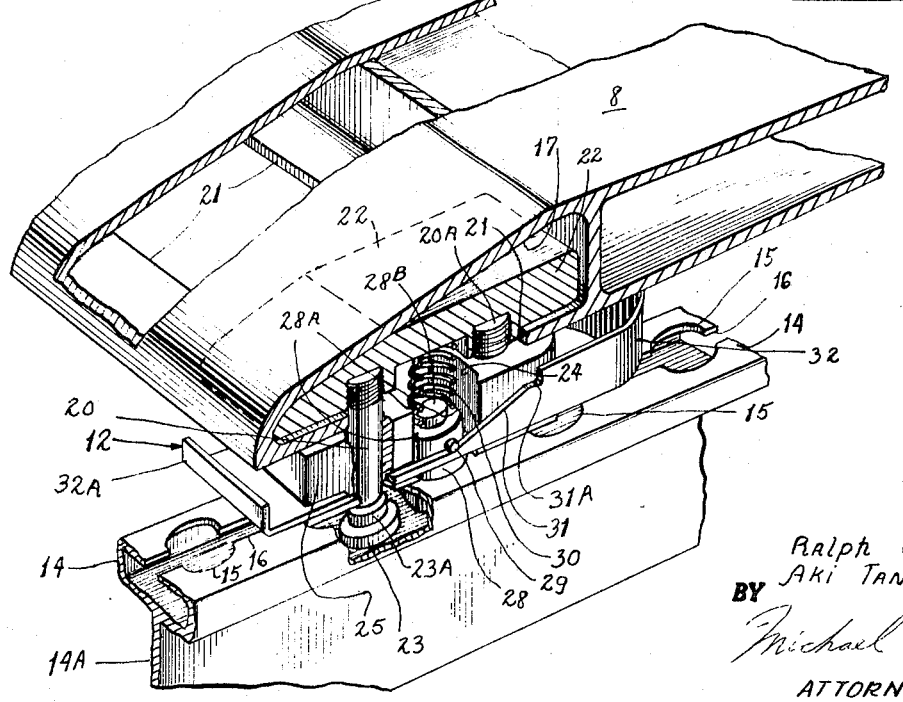
FIG. 2 is an enlarged broken perspective sectional view of a portion of the structure illustrated in FIG. 1 with certain parts broken away taken along the line 2-2 in FIG. 1 and showing the mobile track locking device of this invention cooperating with the vehicle seat locking track.

In accordance with the present invention, as best illustrated in FIGS. 2 through 4 securing means comprising studs 20 that are adaptable to ride within the tracks 10 or 10A, are incorporated in the locking means 12, for securing the laterally adjustable members 22 to the locking tracks. These members 22 are partially accommodated in tandem fashion within the tapered channels 17 located at the forward and rearward portions of the aforementioned floor panels 8, as best seen in FIG. 3, and are laterally adjustable within the channels 17 so that they may be located in relation to the vehicle locking track locations. To lend additional rigidity and to enhance its sound and vibration absorbing characteristics, the floor panel structure 8, and more particularly that area situated between the channel portions 17 may be filled with honeycomb 19 or foam or the like as shown in FIG. 3 of the drawings.

The underside of the channel portions 17 of the floor panel 8 is provided with lateral slots or openings 21 which extend in a direction that is substantially perpendicular to the direction of the vehicle locking tracks 10 and 10A.

As previously indicated, the connecting means, generally designated 12, include a member 22 which is situated and rides within and is laterally displaceable within the channel 17 of the floor panel 8. The member 22 is shaped so as to be complimentary to the taper of the channels 17 and accommodates the aforementioned studs 20 located therein by the threaded connection 20A. The studs 20 descend from the laterally displaceable member 22 through the slotted opening 21 which is provided in the lower portion of the channel 17 of the floor panel 8. These studs are spaced to coincide with the spacing of the apertures 15 in the upper surface of the vehicle track locks 10 and 10A and are of suitable diameter to permit them to pass through the slotted portions 16 between the apertures 15 in the locking track. The lower ends of the studs 20 are provided with an enlarged diameter section 23 and shoulder 23A which are sized to pass through the apertures 15 so that the enlarged end 23 of the studs 20 may be inserted into the apertures 15 and moved forward or backward within the tracks to permit the shoulder portion 23A to abut the underside of the track members 10, 10A adjacent the slotted portion 16 and thereby in cooperation with other mechanisms yet to be described, lock the studs 20 within the locking tracks.

In the present embodiment the connecting means 12 includes actuating means comprising an actuating member 32 that is adapted to engage the locking means for disengaging the locking means from the track 10 or 10A, and a spacer and bearing member 25 that is disposed between the panel 8 and the track 10 or 10A, as best seen in FIGS. 2 and 5. As the name implies, these members disperse a significant portion of the seat assembly weight over a larger area of the vehicle tracks 10, 10A and also space the floor panel 8 above the tracks 10, 10A. Each bearing member 25 has openings 26 to permit passage of the studs 20 which also serve to hold the spacer member in position.

The locking studs 28, are suitably sized to enter the apertures 15 in the locking track and are each situated within the slot 24 in a spacer bearing member 25. While generally cylindrical in shape, the locking stud 28 is provided with flat surfaces 28A on the sides of the stud which face the spacer bearing block 25. These flat surfaces cooperate with similar flat surfaces provided in a slot 24 in the spacer member 25 to guide the stud 28 in vertical travel and support it against any horizontal loads that may be imposed on the locking stud 28.

The uppermost portion of the locking stud 28 is provided with a stub portion 28B of reduced diameter to position one end of a compression spring 30. The other end of the compression spring 30 bears against a lower relieved portion of the member 22 to bias the locking stud 28 in a downward direction. The locking stud 28 is also equipped with a pair of pins 29 (one of which is shown) oppositely disposed from one another on either side of the locking stud 28. These pins 29 are adapted to cooperate with an inclined cam surfaces 31 that are provided on slidable lock actuating members 32, as best seen in FIGS. 2, 3 and 5 of the drawings. It should also be noted that the upper portion of the inclined cam surface 31 terminates in a neutral plane 31A so that the pins 29 will remain in the uppermost position against the force of the compression spring 30 when the slideable actuating member 32 is suitably positioned.

Each slidable actuating member 32 is situated between the lower surface of the floor panel 8 and the vehicle locking tracks 10, 10A and they each have a central rectangular opening 33 of sufficient size to encompass the spacer bearing member 25. The inner surface of the rectangular opening 33 of the slidable actuating member 32 is adapted to be guided by the shoulder 25B on the spacer bearing member 25. In addition, the slidable lock actuating member 32 is provided with an upturned handle portion 32A which on each locking device is situated at the edge of the channel portion of the floor panel member 8 and is accessible from the front or rear of the seat assembly. Consequently, when the member 32 is pulled in a direction away from the seat (as shown in FIG. 3), the pins 29 will ride up on the inclined cam surface 31 causing the locking stud 28 to move it an upward direction against the force of the compression spring 30. Conversely, when the actuating member 32 is pushed inwardly, that is in a direction toward the seat assembly, the locking stud 28 will, under the influence of the compression spring 30, move downwardly along the cam surface 31.

As a result of these arrangements the vehicle seats may be installed or removed rapidly in the following manner.

The vehicle seat assembly is placed over the locking tracks 10, 10A in the approximate location of where they are to be secured. The connecting means 12 are then positioned by moving the laterally displaceable means 22 within the channels 17 in the floor panel 8 so that the studs 20 line up approximately with the apertures 15 in the vehicle locking tracks. The actuating member 32 of each connecting means 12 is then pulled outwardly in the direction away from the seat assembly causing the pins 29 to move upwardly along the inclined surface 31 on the actuating member 32. When the actuating member is in its extreme outward position the pins 29 will be supported in their uppermost position by the neutral portion 31A of the actuating cam 31. The entire seat assembly is then positioned to enable each of the enlarged diameters 23 of the studs 20 to enter one of the apertures 15 in the vehicle locking tracks 10, 10A. When each stud 20 is thus positioned the actuating member 32 of each connecting means 12 may be pushed inwardly, that is in the direction of the seat assembly. This will cause the inclined cam surface 31 of each actuating member to move away from the pins 29 on the locking studs 28 of each locking device 12. Although the studs 28 are under the influence of their associated compression springs 30, the pins 29 will be prevented from following the cam due to the fact that the end of stud 28 will at this time be pressing against the upper surface of the vehicle track. However, since the position of the locking stud 28 will not at this stage coincide with any of the apertures in the locking tracks 10 and 10A, it will at this stage be prevented from entering the locking track, although urged against its upper surface by the spring 30.

The entire seat assembly may then be urged in a forward or rearward direction as desired, whereupon the studs 20 will slide within the slotted portion 16 of the vehicle locking tracks 10, 10A until the locking studs 28 under spring pressure are aligned with the next aperture 15, at which time the stud 28 will enter the aperture in the locking track and prevent further movement. In this locked position the enlarged areas 23 of studs 20 will be positioned as shown in FIG. 4 and will be restrained from vertical movement while the locking studs 28 that are in engagement with the apertures 15 will prevent movement in a fore and aft direction.

Removal of the seat assembly is equally simple in that each actuating member handle 32A of the connecting means 12 is pulled outward or in other words, away from the seat assembly, causing the pins 29 on the locking stud 28 to be moved upwardly along the cam surface 31 against the force of spring 30. When the actuating handle 32A is in its outermost position, the pins 29 will have reached the neutral portion of the cam surface 31A of the member 32 and the associated locking stud 28 will be out of engagement with the vehicle locking track aperture. When this is accomplished on each connecting means 12, the entire seat assembly may be moved forward or backward until the enlarged portions 23 of the studs 20 line up with the apertures 15 in the locking tracks 10, 10A, whereupon the entire seat assembly may be lifted out of engagement with the locking tracks.

The invention has been described in its preferred form and by way of example only and obviously many variations and modifications may be made without departing from the spirit of the invention. Therefore, the invention should not be limited to any specific form or embodiment except insofar as such limitations are set forth in the appended claims.

What is claimed is:

1. An apparatus for securing passenger seats to locking tracks in a vehicle comprising a plurality of seat supporting means connected to the seats for supporting the seats, a panel disposed beneath and connected to the lower ends of said seat supporting means, and connecting means operatively connected to said panel for connecting said panel to the locking tracks, said connecting means being laterally adjustable for permitting the connection of said panel to variously spaced locking tracks.

2. The apparatus as recited in claim 1 wherein said panel has at least one channel and said connecting means includes at least one laterally displaceable member that rides within said channel.

3. The apparatus as recited in claim 1 wherein said panel has sound absorbing material.

4. The apparatus as recited in claim 1 wherein said connecting means includes a bearing member disposed beneath said panel for dispersing the weight of the seats over an area of the tracks.

5. The apparatus as recited in claim 1 wherein said connecting means includes securing means connected to said laterally displaceable member for securing said laterally displaceable member to the locking tracks.

6. The apparatus as recited in claim 5 wherein said securing means comprises at least one stud that is adapted to ride within the tracks.

7. The apparatus as recited in claim 5 wherein said connecting means includes locking means adapted to engage the locking tracks for locking said securing means in the locking tracks.

8. The apparatus as recited in claim 7 wherein said connecting means includes actuating means adapted to engage said locking means for disengaging said locking means from the tracks.

9. The apparatus as recited in claim 7 wherein said locking means comprises a locking stud.

* * * * *